United States Patent [19]

Wooldridge

[11] Patent Number: 4,518,836

[45] Date of Patent: May 21, 1985

[54] CONTROL POD AND SWITCH ASSEMBLY

[75] Inventor: George A. Wooldridge, Warren, Mich.

[73] Assignee: United Technologies Automotive, Inc., Dearborn, Mich.

[21] Appl. No.: 601,190

[22] Filed: Apr. 14, 1984

[51] Int. Cl.³ .............................................. H01H 9/00
[52] U.S. Cl. .................................................. 200/61.54
[58] Field of Search .......... 200/5 R, 5 A, 1 R, 11 D, 200/11 DA, 16 C, 16 D, 52 R, 61.27, 61.3, 61.34, 61.35, 61.54–61.57, 83 N, 153 K, 159 B, 314, 315, 339, 157, 61.85

[56] References Cited

U.S. PATENT DOCUMENTS

| 4,131,772 | 12/1978 | Weckenmann et al. | 200/61.54 |
| 4,180,713 | 12/1979 | Gonzales | 200/52 R |
| 4,204,098 | 5/1980 | Strande | 200/1 R |
| 4,351,991 | 9/1982 | Morita et al. | 200/61.27 |
| 4,352,401 | 10/1982 | Vitaloni | 180/90 |
| 4,360,722 | 11/1982 | Georgopulos | 200/314 |
| 4,383,155 | 5/1983 | Tenner | 200/315 |
| 4,394,555 | 7/1983 | Long et al. | 200/159 R |
| 4,425,487 | 1/1984 | Hsieh | 200/153 K |
| 4,436,970 | 3/1984 | Swisher | 200/61.56 |

FOREIGN PATENT DOCUMENTS

| 1082815 | 6/1960 | Fed. Rep. of Germany | 200/339 |
| 2023938A | 1/1980 | United Kingdom | 200/61.54 |

Primary Examiner—J. R. Scott
Attorney, Agent, or Firm—Stephen A. Schneeberger

[57] ABSTRACT

A control pod for a vehicle is structured and positioned to provide easy manual access to the actuators for pairs of functionally-related mechanical switches housed in the control pod. Integrally-formed pairs of actuators are associated with respective pairs of functionally-related switches. Each switch of a pair is mounted on an opposite side of a circuit board from the other switch. The circuit board is mounted in a control pod housing, and the pairs of actuators are connected to the circuit board. Each actuator of a pair extends to an opposite side of the circuit board for actuation of the respective switch. A pair of actuators are joined at a common midsection and are resiliently deformable about that midsection to provide the displacement required for switch actuation. Pairs of visual indicators are positioned on the control pod in proximity with a respective pair of actuators for signifying actuation of respectiive ones of an associated pair of switches.

17 Claims, 4 Drawing Figures

CONTROL POD AND SWITCH ASSEMBLY

DESCRIPTION

TECHNICAL FIELD

The present invention relates to a control pod and switch assembly, and more particularly to a control pod and switch assembly for use in vehicles. More particularly still, the invention relates to a control pod especially suited for use in automotive vehicles and to a switch assembly usable in such control pod to facilitate operator control.

BACKGROUND ART

It has been known to mount various switches at various, typically outboard, locations on a cantilevered support or housing extending from the steering column of the vehicle for controlling the operation of an automotive vehicle. One example of such arrangement is disclosed in U.S. Pat. No. 4,131,772 to Weckenmann et al for "Switch Box And Control Unit Assembly For Automotive Vehicles". In that arrangement, cantilevered, free-standing, multi-faceted, elongated hollow box-like structure is secured to the steering post housing between the steering wheel and the dashboard. A plurality of touch-sensitive switches are located on the surfaces of the structure defined by the facets thereof. The structure includes printed, or integrated circuits to which the switches are connected which, in turn, are attached to a cable which is separably connected to the cabling of the vehicle. Discrete switch functions, such as headlight energization, windshield wiper controls and the like are mounted on discrete, different surfaces of the box-like structures, whereas similar functions with different control effects such as windshield wiper speed can be mounted on the same surface, so that erroneous operation of the switch will not initiate an erroneous function.

In the aforementioned switchbox and control unit assembly of the Weckenmann et al patent, the switches aredisclosed as being of a touch-sensitive type which characteristically undergo substantially no mechanical displacement in providing an electrical signal in response to a touch. To avoid operator confusion, discrete switch functions, such as headlight energization, windshield wiper controls and the like are mounted on discrete, different surfaces of the switchbox. Such arrangement requires a relatively large number of facets to the switchbox if a relatively large number of control functions is to be controlled therefrom. Moreover, the use of such touch-sensitive switches fails to provide the tactile feedback to an operator for tactilely indicating switch location and actuation.

One form of switch assembly finding utilization in automotive application is illustrated in U.S. Pat. No. 4,394,555 to Long et al for "Switch Assembly With Pivoted Actuator". Such switch assembly provides a tactile response to the operator when the switch is actuated. That switch assembly is particularly suitable for a situation in which a mechanically actuated switch is mounted on a printed circuit board which is in turn disposed transversely to a control panel in which the tactile input to the switch actuator is positioned. The switch actuator is journaled into a portion of the switch assembly housing to permit the actuator to pivot. The actuator is offset to that side of the printed circuit board on which the switch is mounted.

While the arrangement of the Long et al patent does provide a tactile response to the operator, it requires a relatively large surface area on both the switch panel and the printed circuit board to accommodate a particular number of switch functions, and thus may not be particularly well suited for those applications in which such space is at a premium.

SUMMARY OF INVENTION

It is a principal object of the present invention to provide a control pod, for use in vehicles, in which a number of control switches may be positioned in the region of the steering wheel.

It is another object of the present invention to provide a control pod for use in vehicles in which the switch actuators for switches associated with the control pod are organized in a functionally-related manner to facilitate operator use. Included within this object is the provision of switches and switch actuators which facilitate tactile feedback to an operator.

It is a still further object of the present invention to provide a switch assembly employing a plurality of switches and associated mechanical input actuators organized in such manner as to provide efficient utilization of space and to facilitate operator usage.

In accordance with the present invention there is provided an improved control pod for use in vehicles, and especially automotive vehicles. The control pod includes a hollow pod housing for cantilevered mounting in the vehicle such that a control-input portion thereof is positioned for easy access by one hand of an operator. One, or typically more, pairs of functionally-related switches are mounted interiorly of the pod housing. Each switch is responsive to a respective mechanical input stimulus to effect switch actuation. A respective pair of manually-operated switch actuators is associated with each respective pair of functionally-related switches. Each pair of switch actuators is mounted in the housing and is configured and positioned such that a respective actuator is associated with a respective switch and includes a respective tactile input region and a switch-contacting portion. Each of the pairs of actuator tactile input regions is located at the control-input part of the pod housing and is positioned for readily accessible, manually-complemental operation by one hand of an operator. The pod housing is contoured to define an external surface facing in at least two different directions, in the control-input region and each tactile input region of a respective pair of actuators is positioned such that it faces in a respective one of the two different directions to facilitate separation and tactile identification of each touch input region of a respective pair.

In a preferred arrangement, the mechanical switches are positioned on opposite sides of a circuit board mounted within the pod housing. Each pair of switch actuators is of integral construction and includes a mid-section common to both actuators of the pair. The tactile input region of each actuator is resiliently deflectable about the actuator-pair midsection, and that midsection is mounted so as to prevent its rotation relative to the circuit board and pod housing. For instance, the actuator pair midsection may be fixedly connected to the printed circuit board adjacent one edge thereof.

In a preferred embodiment, the control pod houses a plurality of pairs of switches mounted on the circuit board and correspondingly mounts a similar plurality of pairs of switch actuators. The pairs of actuators are preferably arrayed in parallel alignment and are formed as an integral construction connected by a common spine extending through their respective midsections. The control-input portion of the control pod housing includes an opening in which the tactile input regions of the respective actuator pairs are positioned to provide manual access thereto. Each of the tactile input regions of a switch actuator includes a flange or skirt which extends beyond the perimeter of the housing opening to limit movement of the actuator outwardly of the housing. The switch actuators are configured and positioned, relative to the housing, such that the actuators are biased to a rest position with the flange portions thereof in engagement with the interior of the housing. Visual indicators associated with both switches of a functionally-related pair are positioned on the housing in proximity with the respective pair of switch actuators for indicating the actuation of a respective switch.

BEST MODE FOR CARRYING OUT THE INVENTION

Figure 1:
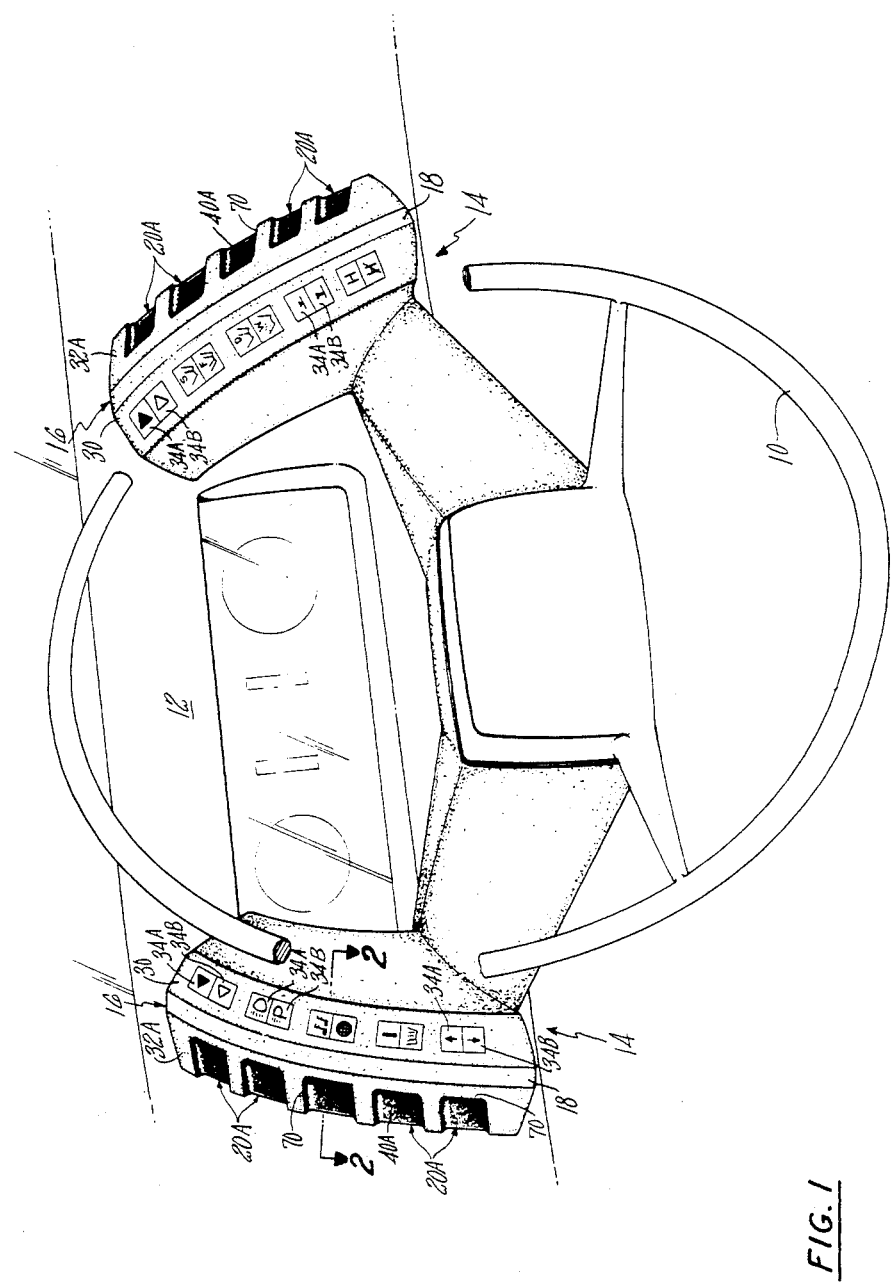
FIG. 1 is a general perspective view, looking forward from an operator's left shoulder in an automotive vehicle and illustrating a pair of control pods according to the invention, with the steering wheel partly broken away.

Referring to FIG. 1 there is illustrated a steering wheel 10 and a dashboard 12 located immediately in front of an operator's position within the passenger compartment of an automotive vehicle. The steering wheel 10 is concentrically mounted to a steering column (not shown) in a conventional manner. The steering column spaces the steering wall 10 some distance rearwardly of the dashboard 12. A pair of control pods 14 extend outwardly from the steering column on opposite sides thereof in the space between the steering wheel 10 and the dashboard 12. Each control pod 14 is mounted in cantilevered fashion to the steering column and includes a control input portion, generally designated 16, near the outer extremity thereof. Each control pod 14 includes a housing 18 which preferably is a plastic unit made, for example, of a suitable thermosetting plastic of two or possibly more integral elements, with one or more of those housing elements being removable to provide access to the interior of the housing for installation and/or repair of the elements housed therewithin.

Each control pod 14, at least at its outboard, control input region 16, is contoured to generally follow the curvature of the steering wheel 10. The control pods 14 are positioned such that the control input portion 16 thereof are generally near the ten o'clock and two o'clock positions, respectively, of the steering wheel 10. The control pods 14 are mounted to the steering column in such manner and such position tilting upward and downward with the steering wheel 10 if it is of the adjustable type.

In accordance with the invention, each control pod 14 includes at least one, and preferably a plurality of, paired control inputs positioned in the control-input portion 16 of the housing 18. The control inputs are paired in accordance with the functions to be controlled. Those functions are logically related, as for instance, left turn/left flash-to-pass; headlight/parking lights; radio on or off/volume (ramp up or down); right turn/right flash-to-pass; wipers on or off, slow/wipers on or off, fast; wipers delay (ramped)/washer; and others. Such pairing of related control functions enables the associated control inputs to be physically paired in accordance with the invention to provide egronomic advantage to the operator in remembering and exercising the control function. Additionally, paired organization of the control inputs may also simplify the physical positioning of switches and other circuitry internally of housing 18 inasmuch as related functions, and thus related circuitry, may be located in a common region. In the illustrated embodiment, each control pod 14 is shown as having the capability for controlling five "paired" functions, or in other words ten individual functions.

Figure 2:
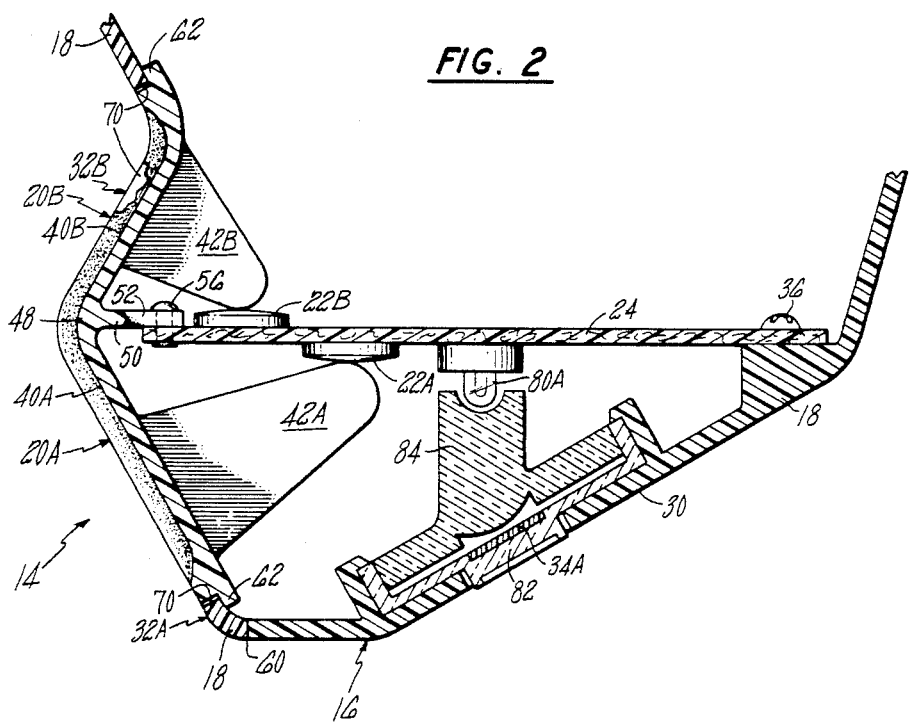
FIG. 2 is a partial sectional view of a control pod taken along line 2—2 of FIG. 1 and illustrating the switch assembly therein.

The input control for each pair of related functions is provided by an arrangement of paired actuators 20A and 20B (FIGS. 2-4) in accordance with the invention. In the illustrated embodiment, there are five pairs of actuators 20A, 20B associated with each control pod 14, those being arrayed in parallel alignment, one below the other, in the control-input portion 16 of the pod 14. Each of the actuators 20A, 20B is associated with a respective switch 22A, 22B (FIGS. 2 and 4). The switches 22A and 22B comprise a pair of functionally related switches and are disposed on opposite sides of a printed circuit board 24. Each of the switches 22A and 22B is of a type which responds to a mechanical input stimulus to effect switch actuation. For instance, switches 22A and 22B may be of a type in which a bridge contact straddles another contact, and the bridge or dome contact is moved into electrical contact with the fixed contact by application of pressure to the bridge. Such switches are well known, one example being that illustrated in the aforementioned U.S. Pat. No. 4,394,555. Each switch 22A, 22B provides an electrical input signal to a respective circuit (not shown), all or some of which may be supported on circuit board 24. Inasmuch as the switches 22A, 22B typically control response of some electrical or electomechanical load device elsewhere in the vehicle, appropriate conductive connecting cables (not shown) extend from the circuit board 24 and control pod 14 to the steering column in the manner generally illustrated in the aforementioned U.S. Pat. No. 4,131,772.

The control pod housing 18 is multi-faceted in its radially-outer, or distal, region to provide a display facet 30 and a pair of control input facets 32A and 32B. All three facets 30, 32A and 32B extend generally in a vertical direction and have a somewhat arcuate form to follow the general contour of the steering wheel 10. Pairs of symbol graphics 34A, 34B are mounted in the display facet 30 of housing 18 and are positionally associated with respective pairs of actuators 20A, 20B positioned in proximity therewith. Each switch actuator 20A of a respective pair is disposed in and manually accessible at housing facet 32A and correspondingly, each switch actuator 20B is disposed in and manually accessible at housing facet 32B. The display facet 30 is oriented such that it generally faces the vehicle operator behind the steering wheel. The housing facets 32A and 32B intersect one another and the angle therebetween is sufficiently large to accommodate the internal needs of housing 18, but sufficiently small to provide adequate separation and definition to the two different actuator surfaces. The angle between the actuator housing 32A and 32B may typically be in the range of 120°–150°.

The apex of the housing facets 32A, 32B is both radially outboard and toward the dashboard 12, relative to the display facet 30. The circuit board 24 is positioned within housing 18 in a plane which bisects the angle formed by actuator facets 32A and 32B and is securely mounted to the housing at least partly by a plurality of mounting screws 36 (only one being shown) near its inboard edge. The outboard edge of circuit board 24 is partially supported by the actuator pairs 20A, 20B and correspondingly provides support to those actuators, which are mounted thereon.

Figure 3:
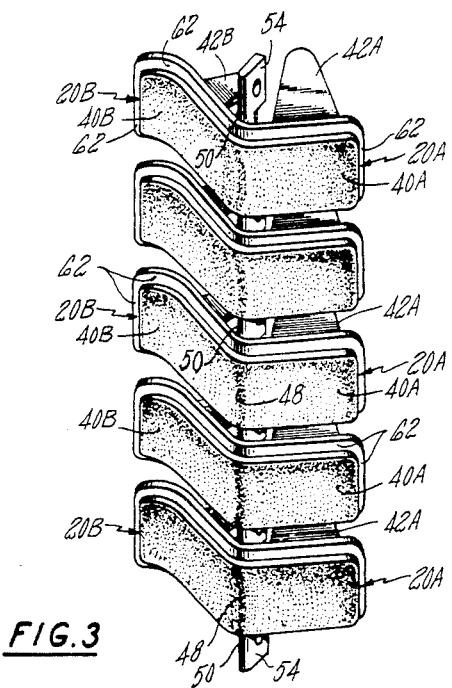
FIG. 3 is an exterior perspective view of the actuator pairs employed in the invention.
Figure 4:
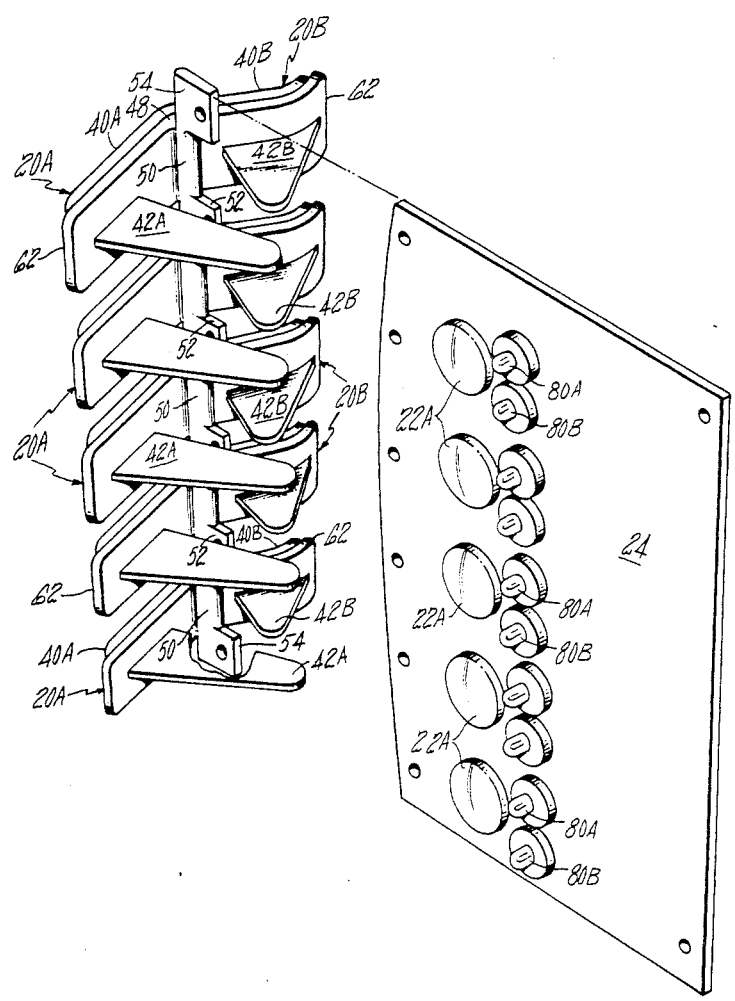
FIG. 4 is an exploded perspective view of the primary parts of the switch assembly of the invention.

Attention is now turned to the construction of the switch actuator pairs 20A, 20B, as seen in FIG. 2 and particularly in FIGS. 3 and 4. Each pair of switch actuators 20A, 20B includes a respective tactile input region 40A, 40B and a respective switch-contacting portion 42A, 42B. The respective tactile input regions 40A, 40B are intended to be oriented substantially parallel to the actuator facets 32A, 32B of the housing 18 when mounted therein and are intended to receive an input force, as from a manual pressing action. The exterior surfaces of the tactile input regions 40A, 40B are "dished" or concave to tactilely facilitate location and identification of the surface by an operator's finger. The switch-contacting portions 42A, 42B extend from the rear surfaces of the respective tactile input regions 40A, 40B in a direction generally inward in housing 18 and are configured such that a slight inwardly-directed displacement or deflection of a respective tactile input region results in displacement of the respective switch-contacting portion, which displacement includes a component substantially normal to the circuit board 24 for actuating a respective switch 22A, 22B.

In the illustrated embodiment, each pair of actuators 20A, 20B is of integral construction, with tactile input regions 40A and 40B extending in generally opposite directions and being joined by a common midsection 48 extending transversely of the pair (i.e., vertically in FIGS. 3 and 4). Still further, the several pairs of actuators 20A, 20B which constitute the array of actuators associated with a particular control pod 30 are integrally joined to one another by a common spine 50, formed integrally therewith and extending transversely of the actuator pairs 20A, 20B along the midsections 48 of the respective pairs of switch actuators. The actuators 20A, 20B and spine 50 are an integrally formed unit, preferably of plastic, as for example of a suitable thermosetting plastic. Although the spine 50 is structured such that it is a relatively rigid member, it does have sufficient flexibility to form a gentle arc over its length to adapt to the contour of the apex of the housing facets 32A, 32B, which in turn is curved to generally conform to the contour of the steering wheel 10. The length and thickness of the respective tactile input region halves 40A, 42B of the respective actuator pairs are such that they may be resiliently deflected or pivoted in an inward direction about the midsection 48 to effect switch actuation.

A series of spaced mounting tabs 52 extend rearwardly, or inwardly, from the spine 50 between each actuator pair 40A, 40B. Singular end-tabs 54 exist at each end of the spine 50. The tabs 52 and 54 include holes therethrough for receiving a rivet or other suitable fastener. The actuator pairs 20A, 20B are operatively positioned relative to the circuit board 24 and respective switches 22A, 22B by urging the spine 50 into abutment with the curved outboard edge of the circuit board along its length. A plurality of holes or openings are formed through the circuit board 24 near the edge which abuts the actuator spine 50, and the sizing and positioning of those openings is such as to align with the openings in the tabs 52 and 54 to receive a rivet 56 or other fastener. The actuators 20A, 20B are affixed to the end of the circuit board 24 by use of the rivets 56 such that a relatively rigid connection therebetween is formed. The tactile input regions 40A, 40B thus extend generally transversely of the circuit board 24.

The actuators 20A, 20B and the circuit board 24 with the respective switches 22A, 22B thus form a switch assembly which may be installed in housing 18 and fixed therein at least partly by one or more mounting screws 36. Referring to FIG. 2, it can be seen that the contour and sizing of pod housing 18 is such, relative to the geometry and orientation of the circuit board 24 and attached actuator pairs 20A, 20B housed therewithin, as to engage and trap the actuator pairs. To effect installation of the actuators 20A, 20B and board 24 within housing 18, it may be desirable to have the housing 18 formed in separate sections, as represented by the break 60 in the housing. It will be understood that such break in the housing might occur at any suitable location which facilitates installation of the actuator and circuit board without adversely affecting the aesthetics and structural integrity of the housing. A lip or flange 62 extends outwardly beyond the perimeter of the respective tactile input regions 40A, 40B of the actuators to form their interior bases and more importantly, to engage the interior surface of the control pod housing 18 to limit outward displacement of the actuators 20A, 20B. Although the angle between the housing facets 32A and 32B may typically be in the range of 120°–150°, the actuator pairs 20A, 20B are molded to have an included angle which is more nearly in the range of 150°–170°. The dimensioning of the printed circuit board 24 is such that the midsection 48 of the actuator pairs 20A, 20B is urged into engagement with the curved interior surface of the housing pod 18 at the apex between the housing facets 32A and 32B. Thus, because the housing facets 32A and 32B are angled at approximately 120°–150° to one another, an actuator pair 20A, 20B is deflected to a similar angle when at rest, thereby resulting in an outward bias to each of the actuator tactile input regions 40A, 40B.

With the actuators 20A, 20B positioned in the housing 18 as illustrated in FIG. 2, each pair of tactile input regions 40A, 40B is manually accessible through a respective one of five, generally rectangularly-shaped openings 70 spanning the housing facets 32A, 32B at the levels of the respective actuator pairs. The dimensions of each housing opening 70 are sufficiently limited as to allow engagement of the actuator flanges 62 with the interior surface of housing 18. Switch-contacting portions 42A, 42B of the actuators each have a finger-like shape which includes a radius or curve at its distal end for striking or contacting the respective switches 22A, 22B. Manual inward displacement of either one of the actuators 20A or 20B results in a corresponding displacement of the respective contacting portion 42A or 42B into the respective switch 22A or 22B for actuation thereof. It will be appreciated that such resilient displacement of an actuator 20A or 20B is effectively about a fixed or nonmoving fulcrum at the actuator midsection 48 and that such arrangement permits concurrent manual actuation of both actuator halves 20A and 20B of a respective functionally-related pair.

In accordance with another aspect of the invention, pairs of lamps 80A and 80B are mounted on the circuit board 24 in alignment with respective pairs of symbol graphics 34A, 34B to provide a visual indication of the actuation of a respective switch 22A, 22B in each pair. Each pair of symbol graphics 34A, 34B is mounted behind a respective graphics bezel 82, in turn mounted in a respective opening in the display facet 30 of the housing 18. A lens structure 84 may be employed intermediate the lamps 80A, 80B and the symbol graphics 34A, 34B to facilitate conduction of light from a particular lamp to the respective graphic symbol. The lamps 80A, 80B associated with a particular pair of symbol graphics 34A, 34B are similarly associated with and actuated by the switches 22A, 22B and actuators 20A, 20B associated with that same particular pair of symbol graphics.

Although this invention has been shown and described with respect to detailed embodiments thereof, it will be understood by those skilled in the art that various changes in form and detail thereof may be made without departing from the spirit and scope of the claimed invention.

Having thus described a typical embodiment of my invention, that which is claimed as new and desired to secure by Letters Patent of the United States is:

1. A control pod for use in vehicles comprising, in combination:
    a hollow pod housing including a control-input portion, said housing being adapted for cantilevered mounting in the vehicle such that said control-input portion thereof is positioned for easy access by one hand of an operator;
    at least one pair of functionally-related switches mounted interiorly of said housing, each said switch being responsive to a respective mechanical input stimulus to effect switch actuation;
    at least one pair of manually-operated switch actuators, said pair of actuators being mounted in said housing and being configured and positioned such that a respective said actuator is associated with a respective said switch and includes a respective tactile region and a switch-contacting portion; and
    each said pair of actuator tactile input regions being located at the control-input portion of said housing and positioned for readily accessible, manually-complemental operation by one hand of an operator.

2. The control pod of claim 1 including plural pairs of said functionally-related switches mounted in said housing and a corresponding plurality of said pair of switch actuators, each said pair of switch actuators being associated with a respective pair of said switches and said pairs of switch actuators in said plurality being arrayed in alignment.

3. The control pod of claim 2 wherein said pod housing is contoured in said control-input portion to define an external surface facing in at least two different directions and wherein each actuator tactile input region of a respective said pair is positioned such that it faces substantially in a respective one of said two different directions thereby to facilitate separation and tactile identification of each tactile input region of a respective pair.

4. The control pod of claim 1 wherein said pair of switch actuators is of integral construction.

5. The control pod of claim 2 wherein the two switch actuators in a said pair thereof are integrally joined.

6. The control pod of claim 5 wherein all of said pairs of switch actuators in said plurality are integrally joined to one another.

7. The control pod of claim 4 wherein each said pair of switch actuators comprises a respective pair of tactile input members extending in generally opposite directions from a common, transversely-extending midsection, a respective said switch contact portion being integrally formed on each said tactile input member, said actuator midsection being mounted in said housing in such manner as to resist rotation of said input members about an axis extending transversely of said input member at said midsection, and said input members each being independently, resiliently deflectable about said actuator midsection from a rest position to move a respective said switch-contacting portion into actuating engagement with a respective said switch.

8. The control pod of claim 7 wherein each said switch-contacting portion comprises a projection extending inwardly from a respective tactile input member.

9. The control pod of claim 6 wherein each said pair of switch actuators comprises a respective pair of tactile input members extending in generally opposite directions from a common, transversely-extending midsection, a respective said switch contact portion being integrally formed on each said tactile input member, said actuator midsection being mounted in said housing in such manner as to resist rotation of said input members about an axis extending transversely of said input member at said midsection, and said input members each being independently, resiliently deflectable about said actuator midsection from a rest position to move a respective said switch-contacting portion into actuating engagement with a respective said switch.

10. The control pod of claim 9 wherein said pairs of switch actuators are joined by a common spine formed integrally therewith and extending transversely thereof along the midsections of the respective pairs of switch actuators.

11. The control pod of claim 10 including a circuit board mounted within said pod housing, the respective switches being mounted on said circuit board, each switch in a said pair being located on the opposite side of the board from the other switch in that pair, and said pairs of switch actuators being positioned relative to said circuit board such that each input member and associated switch-contacting portion of a said pair are operatively disposed on opposite sides of said circuit board to effect operation of the respective switches.

12. The control pod of claim 11 wherein the circuit board is affixed to said housing and said commonly-joined pairs of switch actuators cumulatively include mounting means for connected engagement with said circuit board, said pairs of switch actuators being in connected engagement with said circuit board to maintain a fixed relationship therebetween.

13. The control pod of claim 12 wherein said circuit board includes a plurality of spaced openings extending therethrough, said mounting means on said joined pairs of switch actuators comprises a plurality of mounting tabs extending from said spine and having openings therethrough in alignment with respective said openings in said circuit board, and including fastening means extending through said aligned openings for maintaining said switch actuators and circuit board in connected engagement.

14. The control pod of claim 12 wherein said control input portion of said housing including a respective opening therethrough for allowing manual actuating engagement with the respective said tactile input regions of said pairs of switch actuators, each said tactile input region of a said switch actuator including a flange portion extending therefrom beyond the perimeter of said housing opening to limit movement of said actuator outwardly of said housing, and wherein said switch actuators are configured and positioned, relative to said housing, such that said actuators are biased to a rest position with said flange portions thereof in engagement with the interior of said housing.

15. The control pod of claim 9 further including means responsive to the actuation of each switch of said pair of functionally-related pair of switches for visually indicating said actuation of a respective said switch, said indicating means being located in said pod housing in proximity with said respective pair of switch actuators and being positioned for easy visual access by an operator.

16. A switch assembly comprising:
a circuit board;
a pair of functionally-related switches, each said switch being actuated in response to a respective mechanical input stimulus, each switch of said pair being mounted on an opposite side of circuit board from the other;
a pair of integrally-formed switch actuators, said actuators comprising a respective pair of tactile input members extending in generally opposite directions from a common, transversely-extending midsection, each tactile input member including a switch-contacting portion integrally formed thereon for delivering a mechanical input stimulus to a respective one of said switches, each tactile input member being resiliently deflectable about said actuator midsection to displace said switch-contacting portion; and
means connecting said pair of switch actuators to said circuit board adjacent to an edge of said circuit board that each said tactile input member and switch-contacting portion of said pair extends to a respective side of said circuit board for actuation of the respective said switch mounted thereon.

17. The switch assembly of claim 16 wherein said means connecting said pair of switch actuators to said circuit board substantially prevents rotational displacement of said actuator midsection.

* * * * *

UNITED STATES PATENT AND TRADEMARK OFFICE
CERTIFICATE OF CORRECTION

PATENT NO. : 4,518,836

DATED : May 21, 1985

INVENTOR(S) : George A. Wooldridge

It is certified that error appears in the above-identified patent and that said Letters Patent is hereby corrected as shown below:

On the title page:

Element Number (22) "Filed: April 14, 1984" should be changed to

"Filed: April 17, 1984".

Signed and Sealed this

Sixteenth Day of December, 1986

*Attest:*

DONALD J. QUIGG

*Attesting Officer*  *Commissioner of Patents and Trademarks*